C. F. E. A. BENKISER.
TAP OR COCK.
APPLICATION FILED OCT. 3, 1910.

1,013,731.

Patented Jan. 2, 1912.

2 SHEETS—SHEET 1.

Witnesses

Inventor
C. F. E. A. Benkiser

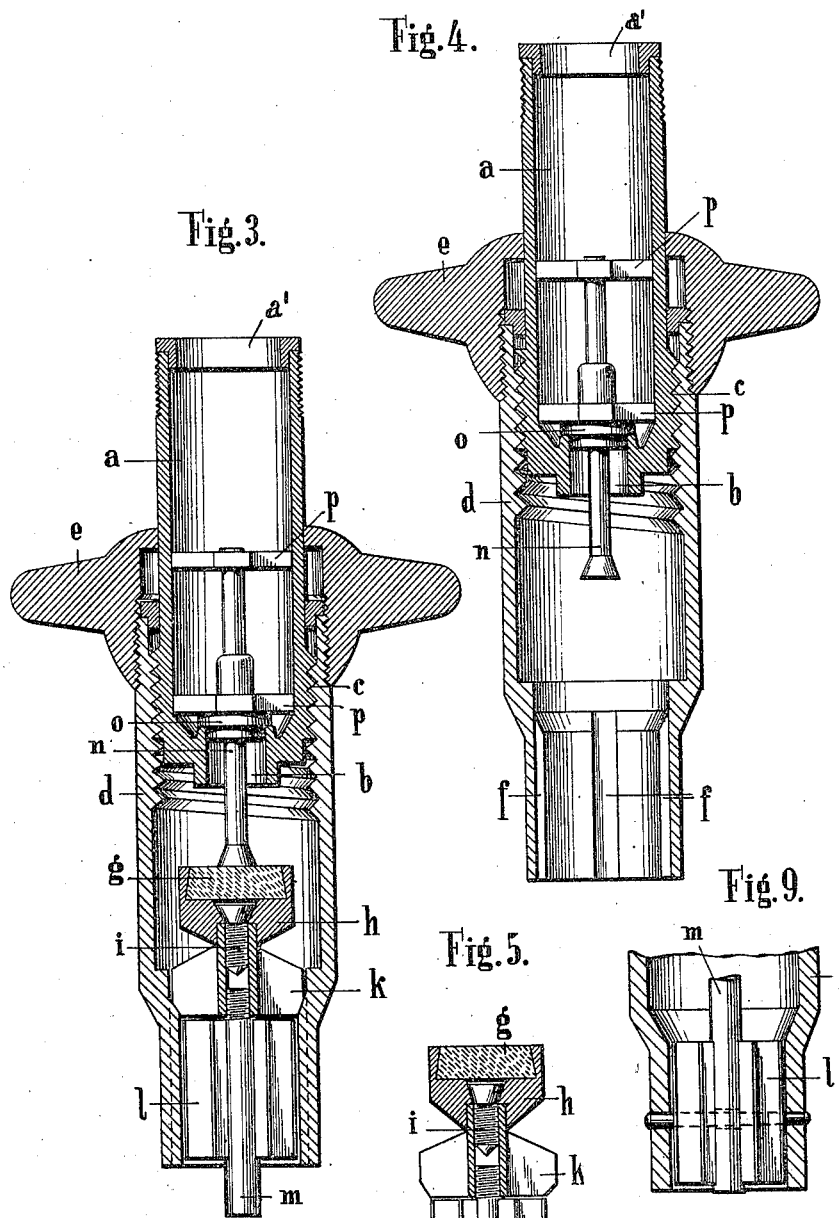

UNITED STATES PATENT OFFICE.

CARL FRIEDRICH EMIL ALBERT BENKISER, OF STRASSBURG, GERMANY.

TAP OR COCK.

1,013,731.  Specification of Letters Patent.  Patented Jan. 2, 1912.

Application filed October 3, 1910. Serial No. 585,105.

*To all whom it may concern:*

Be it known, that I, CARL FRIEDRICH EMIL ALBERT BENKISER, a subject of the King of Wurttemberg, and resident of Strassburg, Alsace-Lorraine, Germany, have invented new and useful Improvements in or Relating to Taps or Cocks, of which the following is a specification.

This invention relates to an improved valve outlet cock or tap in which the packing washer of the valve, which, as is well known, is subject to great wear, can be exchanged at any time without it being necessary to remove the cock from its connection.

A valve cock constructed according to the invention is shown in the accampanying drawings.

Figure 1:
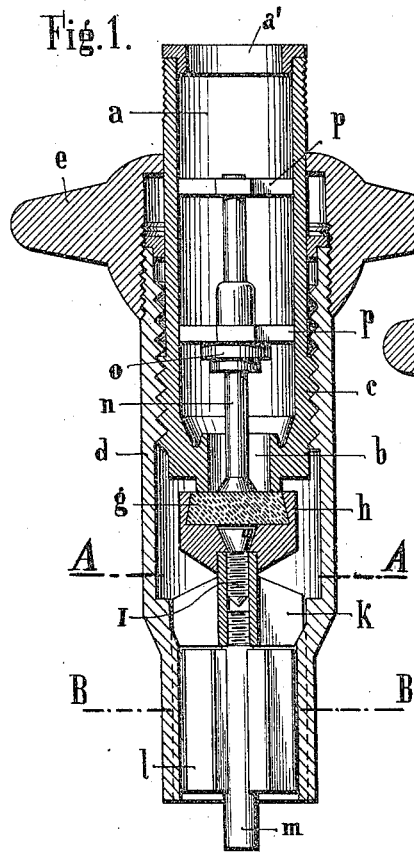
Figure 2:
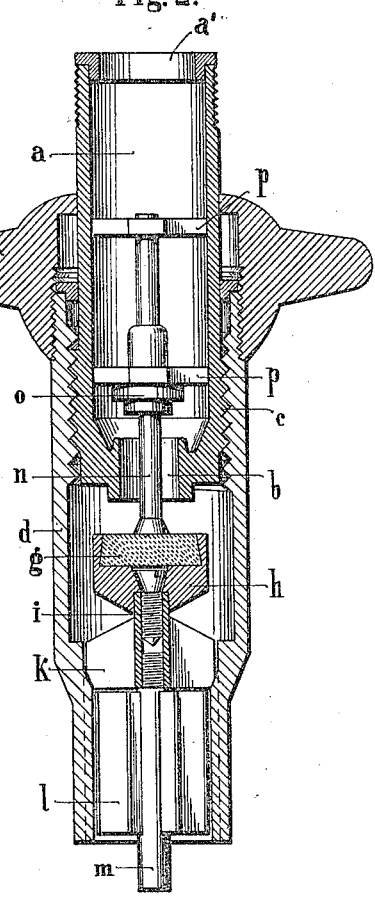
Figure 6:
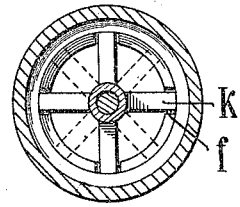
Figure 7:
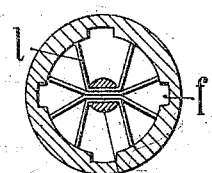
Figure 8:
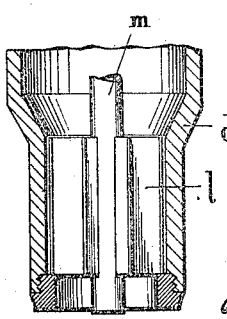

Figure 1 shows a sectional view of a valve cock in the closed, and Fig. 2 in the open position, Fig. 3 is a similar view of the valve cock in such closed position that the main valve can be removed, Fig. 4 shows a sectional view of the valve cock from which the packing washer and the accessories have been removed, Fig. 5 shows the main valve removed, together with the packing washer and the accessory parts. Figs. 6 and 7 are cross-sections on line A—A and B—B respectively of Fig. 1, and Figs. 8 and 9 show in section modified forms of the lower part of the valve cock.

A valve cock according to the present invention consists of a hollow spindle $a$ which is adapted to be screwed on the supply pipe. The spindle $a$ may be provided with a packing ring $a'$ for preventing leaking at the connecting joint with the supply pipe. At its lower end, the hollow spindle $a$ is provided with an outlet $b$, and on its outer surface with a screw thread $c$. On the screw thread $c$ is screwed a casing $d$ provided in the interior with a corresponding female screw thread, in such manner that it can be screwed up and down on the hollow spindle $a$ by means of a handle $e$ fixed to it by a screw thread. The casing $d$ is reduced at its bottom end, and the wall at the said reduced portion is provided with grooves $f$ (Figs. 4, 6, 7). In the bottom portion of the casing is situated the main valve (Fig. 5). The latter carries at the top a packing disk or washer $g$ mounted in the valve plate $h$. The valve plate is secured by means of a screw $i$ threaded into the hollow hub of the valve supports or ribs $k$. These valve supports $k$ are as wide (Fig. 6) as the guide grooves $f$ provided in the reduced bottom portion of the casing, so that the whole main valve (Fig. 5) can be introduced into the casing from the bottom by introducing the valve supports into the grooves, and it is held fast in the casing as shown in Figs. 1–3, as soon as it is turned to a slight extent, preferably through an angle of 45°. Into the hub of the valve supports is screwed from below a holding pin $m$ which, as shown in Fig. 7, is slotted. Into said slot are introduced four rectangular brass plates $l$ which are held fast in the slot by bending them in the shape of a star, and form a jet regulator.

In the hollow spindle $a$ there is mounted a central stem $n$ resting on the packing washer $g$ and carrying an automatically closing valve $o$ which is guided in the hollow spindle by means of two cross guides $p$ fixed to the stem and adapted to rest on the inner seat of the outlet $b$.

When the main valve (Fig. 5) has been introduced into the casing as described, the casing can be screwed on the hollow spindle $a$ by means of the handle $e$, to such an extent that the packing washer $g$ engages with the bottom edge of the outlet $b$ of the hollow spindle, so that the outlet is thus closed (Fig. 1). If, however, the casing $d$ is screwed slightly downward by means of the handle both the valve $o$ and the packing washer $g$ will be out of engagement with their seats (Fig. 2), and the water or the like supplied through the hollow spindle $a$, will be able to pass through the outlet $b$ and escape at the bottom of the casing. If however the casing is screwed still farther downward on the hollow spindle $a$ by means of the handle $e$ (Fig. 3), so that the pin $n$ is not supported by the packing washer, the check valve $o$ will come into engagement with the inner seat of the outlet $b$ and close the passage. In that position (Fig. 4), the main valve can be removed from the casing by slightly raising it and turning it until its valve supports $k$ come into alinement with the guide slots $f$, and the packing can then be changed.

The advantages of the device are several; the vertical position of the automatically closing valve, and the flooding of the same by the liquid, enable the construction to be made very compact, cheap, and suitable for numerous purposes. Every time the tap is used the automatically closing device slides up and down, and it always remains in perfect order and cannot get jammed, as there is very little friction in the hollow spindle.

The cock becomes closed after sufficient rotation of the handle e in either direction instead of in one direction as in the ordinary valve thereby preventing thoughtless or irresponsible persons from making mistakes by turning the handle in the wrong direction, and therefore this valve is especially useful in hospitals and lunatic asylums. When the automatically closing valve o is in the position shown in Fig. 3 and the supply pipe becomes empty the air enters through the outlet b of the spindle a on account of the falling of the liquid in the casing d producing a vacuum, and the atmospheric excess of pressure on the under side of the automatically closing valve o will lift same. The pipe is therefore automatically ventilated, whereby the suspending of a water column in the casing d is prevented, and a complete emptying of the pipe and cock is insured.

The possibility of withdrawing the main valve which is subjected to the most wear, enables repairs to be executed, at any moment, without it being necessary to loosen any rigidly fixed part of the tap or to use any special tools. Thus there is no need of a scratching or destruction of the metal parts, and the jet regulator is simple, cannot be ejected, but can be easily removed and cleaned.

It is to be understood that various changes in the form, proportion and minor details of construction may be resorted to without sacrificing any of the advantages or departing from the spirit of the invention.

Having fully described my invention, what I claim is:—

1. In a valve cock, the combination of a hollow spindle having an outlet and a valve seat at each side of the outlet, a casing threaded on the spindle, a main valve carried by the casing for engaging one of said valve seats, a secondary valve supported by the main valve adapted to engage the other valve seat, and means for supporting the main valve in the casing whereby it can be removed without disconnecting the casing from the spindle, substantially as described.

2. In a valve cock, the combination of a hollow spindle having an outlet and a valve seat at each side of the outlet, a casing threaded on the spindle, a handle secured to the casing for rotating same, a main valve for engaging one of said valve seats, a secondary valve supported by the main valve adapted to engage the other valve seat, a plurality of ribs extending radially from the main valve, a shoulder in the casing, and the casing being provided with grooves extending from the shoulder to the end of the casing for receiving the ribs whereby the ribs can be introduced into said grooves and moved beyond them and then rotated to engage said shoulder for supporting the main valve, substantially as described.

3. In a valve cock, the combination of a hollow spindle having an outlet and a valve seat at each side of the outlet, a casing threaded on the spindle, a handle secured to the casing for rotating same, a main valve for engaging one of said valve seats, a secondary valve supported by the main valve and adapted to engage the other valve seat, a stem fixed to the main valve, a plurality of ribs extending radially from the upper portion of the stem, the stem being slotted, a plurality of plates fixed in the slot in said stem and having their sides bent to form a jet regulator, a shoulder in the casing, and the casing being provided with grooves extending from the shoulder to the end of the casing whereby the ribs can be introduced into said grooves and moved beyond them and then rotated to engage said shoulder for supporting the main valve, substantially as described.

4. In a valve cock, the combination of a hollow spindle having a valve seat at each side of the outlet, a casing threaded on the spindle, a handle secured to the casing for rotating the same, a main valve for engaging one of said valve seats, a secondary valve supported by the main valve adapted to engage the other valve seat, a supporting member, the main valve being secured to the supporting member, a plurality of ribs extending radially from the supporting member, a stem threaded in the supporting member and having a longitudinal slot, a plurality of plates fixed in the slot and having their sides bent to form a jet regulator, a shoulder in the casing, and the casing being provided with grooves extending from said shoulder to the end of the casing for receiving the ribs whereby the ribs can be introduced into said grooves and moved beyond them and then rotated to engage said shoulder for supporting the main valve, substantially as described.

In testimony, that I claim the foregoing as my invention, I have signed my name in presence of two witnesses, this twenty-first day of September 1910.

CARL FRIEDRICH EMIL ALBERT BENKISER.

Witnesses:
  J. CH. METZ,
  AUGUST OOSTERMAN.